(12) United States Patent
Farmer

(10) Patent No.: US 9,205,604 B2
(45) Date of Patent: Dec. 8, 2015

(54) THERMOPLASTIC POLYMER POWDER

(71) Applicant: EADS UK Limited British, London (GB)

(72) Inventor: Benjamin Farmer, Bristol (GB)

(73) Assignee: AIRBUS GROUP LIMITED, London (GB)

( * ) Notice: Subject to any disclaimer, the term of this patent is extended or adjusted under 35 U.S.C. 154(b) by 49 days.

(21) Appl. No.: 13/922,029

(22) Filed: Jun. 19, 2013

(65) Prior Publication Data

US 2013/0337265 A1 Dec. 19, 2013

(30) Foreign Application Priority Data

Jun. 19, 2012 (GB) .................................. 1210850.2

(51) Int. Cl.
*B29C 70/14* (2006.01)
*C08J 3/12* (2006.01)
*B29C 70/88* (2006.01)
*B82Y 30/00* (2011.01)
*B29C 70/54* (2006.01)
*B29C 70/62* (2006.01)
(Continued)

(52) U.S. Cl.
CPC ............... *B29C 70/14* (2013.01); *B29C 70/543* (2013.01); *B29C 70/62* (2013.01); *B29C 70/88* (2013.01); *B82Y 30/00* (2013.01); *C08J 3/126* (2013.01); *C08J 3/16* (2013.01); *C08J 3/203* (2013.01); *Y10T 428/2998* (2015.01)

(58) Field of Classification Search
USPC .......... 264/108, 429, 437, 439; 427/550, 598; 118/640
See application file for complete search history.

(56) References Cited

U.S. PATENT DOCUMENTS

| 4,632,947 | A * | 12/1986 | Wolki ............................ 523/206 |
| 7,550,520 | B2 * | 6/2009 | Daly et al. .................... 523/300 |
| 2002/0185770 | A1 | 12/2002 | McKague |

(Continued)

FOREIGN PATENT DOCUMENTS

| CN | 101717540 A | 6/2010 |
| CN | 101734650 A | 6/2010 |

(Continued)

OTHER PUBLICATIONS

Park et al. (Aligned Single-Wall Carbon Nanotube Polymer Composites Using an Electric Field. Journal of Polymer Science: Part B: Polymer Physics, vol. 44, 1751-1762 (2006)).*

(Continued)

*Primary Examiner* — Atul P. Khare
(74) *Attorney, Agent, or Firm* — Hauptman Ham, LLP

(57) ABSTRACT

A method of modifying a thermoplastic polymer powder. A suspension of thermoplastic polymer powder and reinforcement elements in a liquid is heated within a reaction chamber so that the thermoplastic polymer powder becomes softened and the reinforcement elements migrate into the softened thermoplastic polymer powder to form modified thermoplastic polymer powder. The modified thermoplastic polymer powder is then separated from the liquid. The reinforcement elements have an electromagnetic moment and are subjected to an electromagnetic field as the suspension is heated. The interaction of the electromagnetic field with the electromagnetic moment of the reinforcement elements causes the reinforcement elements to become aligned with the electromagnetic field before they migrate into the powder.

15 Claims, 4 Drawing Sheets

(51) Int. Cl.
*C08J 3/16* (2006.01)
*C08J 3/20* (2006.01)

(56) References Cited

U.S. PATENT DOCUMENTS

| | | |
|---|---|---|
| 2003/0096104 A1 | 5/2003 | Tobita et al. |
| 2005/0061496 A1 | 3/2005 | Matabayas, Jr. |
| 2006/0269695 A1 | 11/2006 | Daly et al. |
| 2010/0021819 A1 | 1/2010 | Zhamu et al. |
| 2010/0143668 A1 | 6/2010 | Farmer et al. |
| 2010/0267902 A1* | 10/2010 | Cai et al. ............... 525/331.5 |
| 2012/0009426 A1* | 1/2012 | Song et al. ............... 428/404 |

FOREIGN PATENT DOCUMENTS

| | | | |
|---|---|---|---|
| CN | 102604282 A * | 7/2012 | |
| DE | 10013617 A1 | 9/2001 | |
| DE | 102009044633 A1 | 5/2011 | |
| WO | 2008029178 A1 | 3/2008 | |
| WO | 2008055371 A2 | 5/2008 | |
| WO | 2009022167 A3 | 2/2009 | |
| WO | 2010106358 A1 | 9/2010 | |
| WO | 2010139077 A1 | 12/2010 | |

OTHER PUBLICATIONS

Extended European Search Report for Application No. 13171987.4-1306 dated Sep. 16, 2013.

Extended European Search Report for Application No. 13171987.4-1306 dated Oct. 20, 2014.

* cited by examiner

THERMOPLASTIC POLYMER POWDER

RELATED APPLICATIONS

The present application claims priority from British Application Number 1210580.2, filed Jun. 19, 2012, the disclosure of which is hereby incorporated by reference herein in its entirety.

FIELD OF THE INVENTION

The present invention relates to a thermoplastic polymer powder loaded with reinforcement elements, and a method and apparatus for modifying a thermoplastic polymer powder to load it with such elements.

BACKGROUND OF THE INVENTION

A thermoplastic polymer powder loaded with reinforcement elements is described in WO2009/022167. The powder is used as a feedstock for an additive powder bed manufacturing process in which the powder particles are aligned by an electromagnetic field. The powder is produced by forming a fibre and then chopping the fibre into a series of short lengths.

An object of the invention is to provide an alternative method for producing a thermoplastic polymer powder loaded with reinforcement elements which is suitable for use in such an additive powder bed manufacturing process or any other process requiring the powder particles to be aligned by an electromagnetic field.

A process for producing a polymer loaded with clay is described in WO2010/106358. However the process does not provide any means for controlling the orientation of the clay particles, and limits the reinforcement chemistry and morphology to clay materials.

SUMMARY OF THE INVENTION

The present invention provides a method and apparatus for modifying a thermoplastic polymer powder, and a thermoplastic polymer powder, as set out in the appended claims.

The process may be a batch process in which material is fed in and out of the reaction chamber via a single inlet/outlet. However more preferably the reaction chamber has an inlet and an outlet, and the method is a continuous process in which material is simultaneously fed into the reaction chamber via the inlet and out of the reaction chamber via the outlet as the suspension within the chamber is being heated and irradiated.

The modified thermoplastic polymer powder may be fed out of the reaction chamber via the outlet after it has been separated from the liquid, but more preferably the modified thermoplastic polymer powder is fed out of the reaction chamber via the outlet suspended in the liquid and then separated from the liquid after it has been fed out of the reaction chamber via the outlet.

The powder and reinforcement elements may be mixed within the reaction chamber, but more preferably they are mixed in a mixing chamber before being fed into the reaction chamber via the inlet. Optionally the powder and reinforcement elements may be agitated in the mixing chamber, for instance by stirring or by applying ultrasound.

The electromagnetic field may be applied by any suitable means such as a pair of electrodes, or a coil surrounding the reaction chamber.

Optionally the coil may be used not only to apply the electromagnetic field but also to act as the heating element for heating the suspension in the reaction chamber, in other words the coil and the heating element may be one and the same.

The reaction chamber may be pressurised to that the suspension is heated at an elevated pressure.

The suspension is typically heated to a temperature close to the melting point of the powder, for instance between about 10° C. below the melting point and about 10° C. above the melting point of the polymer. Most preferably the maximum temperature is below the melting point of the powder.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
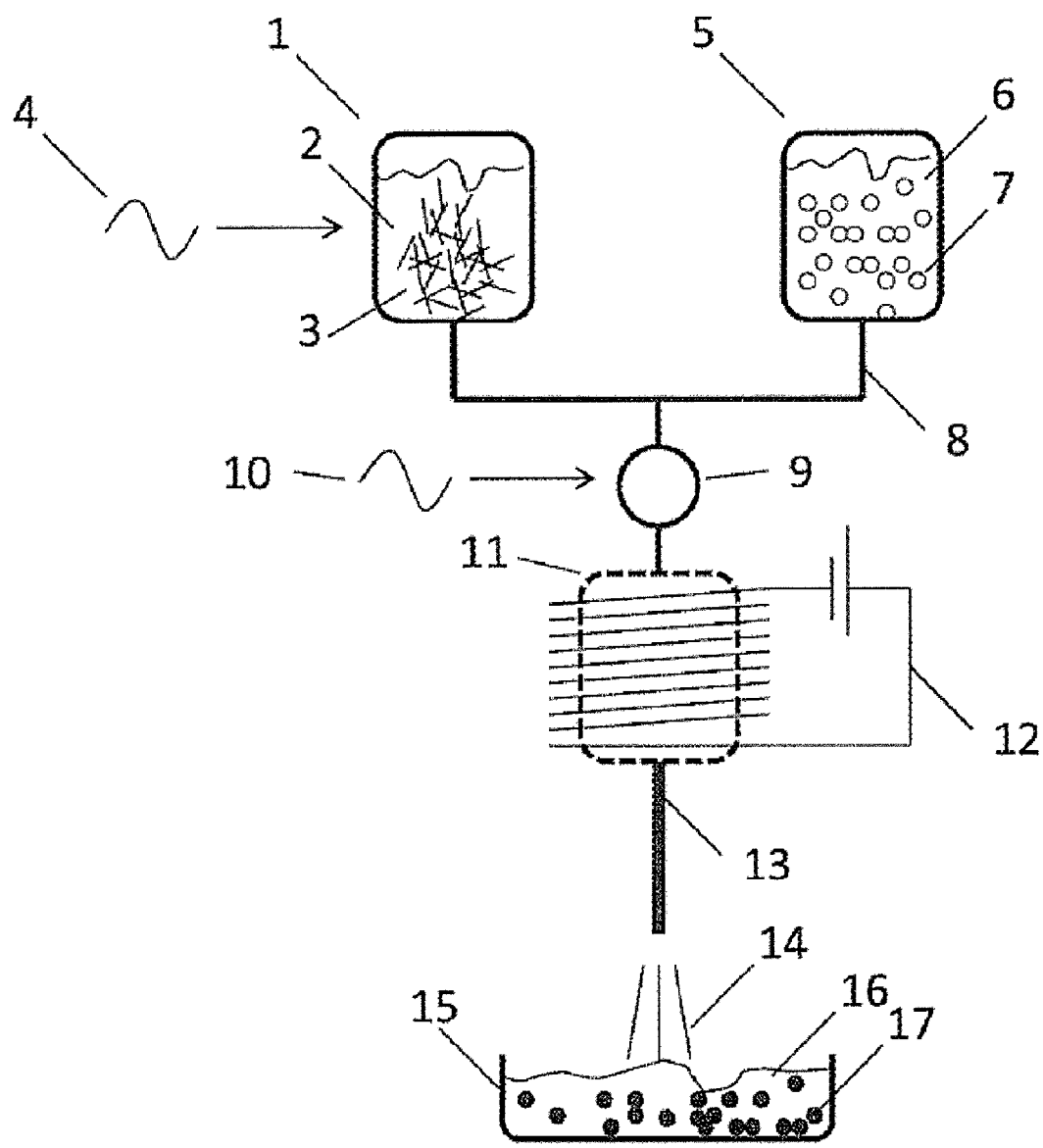
FIG. 1 shows apparatus for modifying a thermoplastic polymer powder.

FIG. 1 shows apparatus for modifying a thermoplastic polymer powder. The apparatus comprises a first vessel 1 containing a suspension of reinforcement elements 3 in a liquid 2, and a second vessel 5 containing a suspension of thermoplastic polymer powder 7 in a liquid 6 which is the same as the liquid 2.

The reinforcement elements 3 can be any conducting high aspect ratio particles with a magnetic moment, for instance carbon-based elements such as carbon nanotubes or graphene, or metallic elements such as iron nanoparticles, copper filaments, aluminium filaments or copper nanotubes.

Powdered polymer is preferable, as this provides a large surface area for adhesion. The powder needs to be of a size distribution suitable for selective laser sintering.

Preferred polymers include nylons, polyethylene, polypropylene, polystyrene, poly (methyl methacrylate), poly (vinyl chloride), poly (vinyl acetate), polycarbonate, polycaprolactone, poly (ethylene oxide), poly (vinyl alcohol), poly (ethylene terephthalate), poly (ether sulphone), poly (butyl terephthalate), poly (ethyl methacrylate), ultrahigh molecular weight polyethylene. Particularly preferred polymers include nylons, polyaryletherketones such as polyetherketone or polyetheretherketone, polyvinylchlorides, polycaprolactones, styrene-vinyl acetate diblock copolymers, polyolefins such as polypropylene or polyethylene, and olefin-based copolymers. The particulate polymer may be amorphous, semi-crystalline or crystalline before it is heated. The process is applicable to single polymers and to mixtures of polymers. For example the mixture may be of polymers of the same composition but of different molecular weight, or chemically different polymers.

A mixing chamber 9 is coupled to the first and second vessels via connecting pipes 8. In the example of FIG. 1 the pipes 8 from the two vessels join at a junction before being fed to the mixing chamber 9 via a single inlet so they are at least partially mixed before being fed into the mixing chamber 9.

Alternatively the pipe from each vessel 1,5 may feed directly into the mixing chamber 9 via a separate inlet so that mixing occurs first within the mixing chamber 9.

The flow into the mixing chamber is regulated by a pressure reducing valve (not shown).

Figure 2:
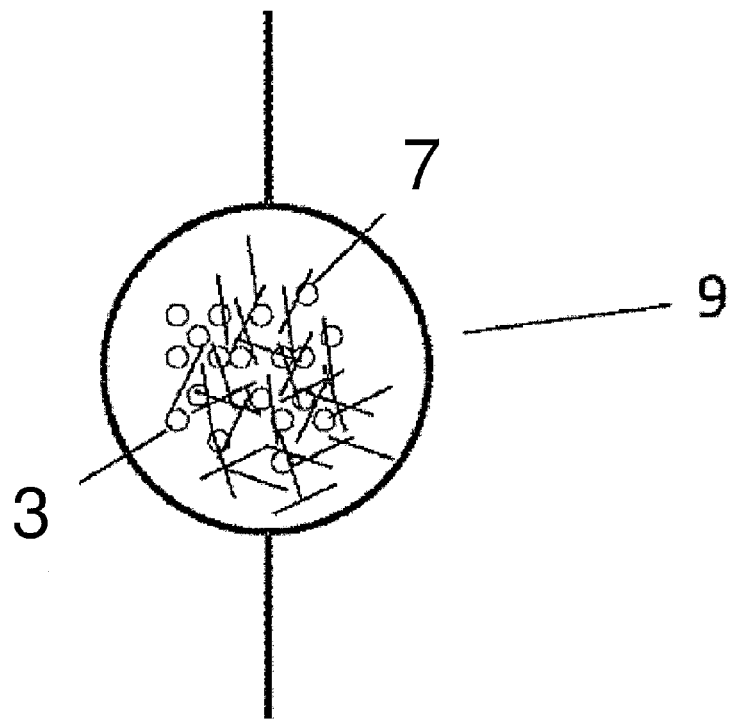
FIG. 2 is an enlarged view of the mixing chamber.

An ultrasonic source 10 connected to the mixing chamber 9 applies ultrasound to agitate the thermoplastic polymer powder and the reinforcement elements in the mixing chamber and ensure intimate mixing. FIG. 2 is an enlarged view of the mixing chamber 9 containing a homogenized dispersion of reinforcement elements 3 and thermoplastic particles 7.

A reaction chamber 11 is provided with an inlet coupled to the mixing chamber 9 for receiving the homogenized suspension, and an outlet for feeding material out of the reaction chamber via an exhaust pipe 13. The flow out of the reaction chamber is regulated by a pressure reducing valve (not shown).

A heating element is provided for heating the suspension in the reaction chamber 11. The heating element may be for example a coil (not shown) of Nichrome (80% nickel, 20% chromium) surrounding the chamber.

The homogenized suspension in the reaction chamber 11 is heated to a temperature above the boiling point of the liquid at 1 bar and held under elevated pressure to increase the boiling point of the liquid. The exact combination of temperature and pressure is chosen so that the boiling point of the liquid is in the region of the melting point (Tm) of the thermoplastic particles. Preferably the boiling point of the liquid is slightly above Tm.

Figure 5:
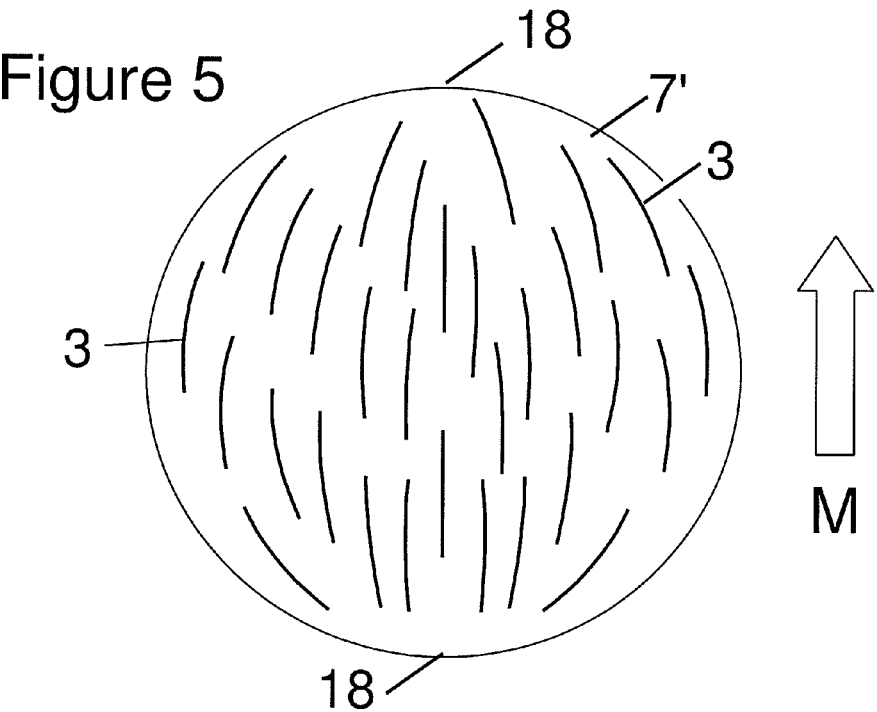
FIG. 5 is a side view of a modified powder particle.

The temperature of the reaction chamber 11 is raised to a maximum temperature which is slightly below the melting point of the polymer—typically between about 2° C. and about 8° C. below the melting point of the polymer. This causes the thermoplastic polymer powder to become softened so that the reinforcement elements migrate into the softened thermoplastic polymer powder to form modified thermoplastic polymer powder particles as shown in FIG. 5 (which will be described further below).

Figure 3:
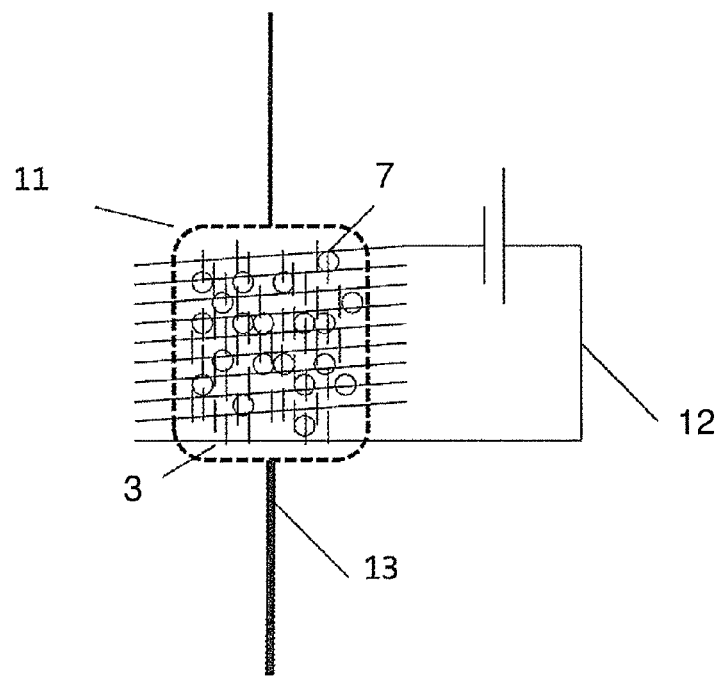
FIG. 3 is an enlarged view of the reaction chamber.
Figure 4:
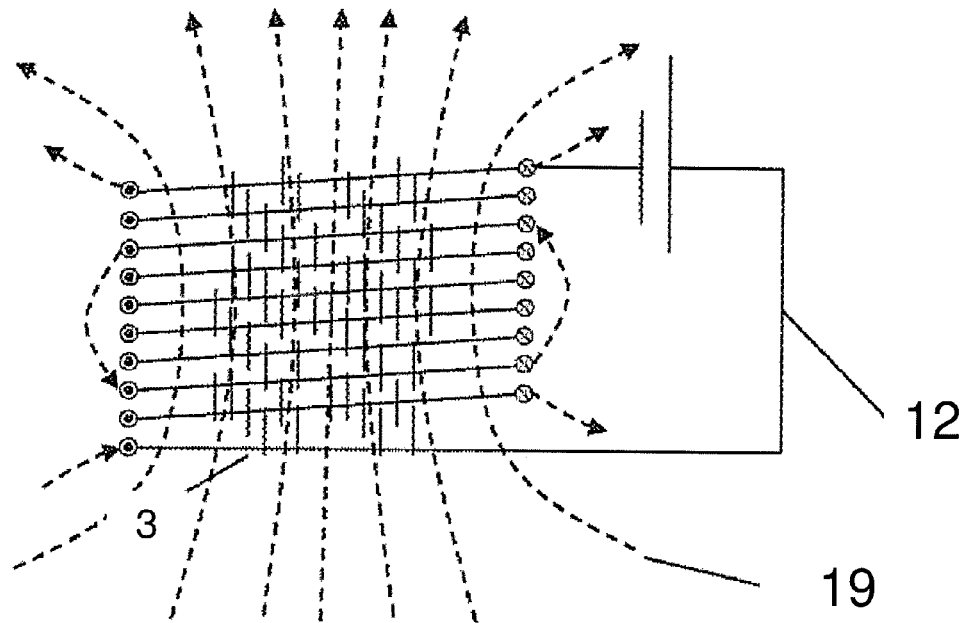
FIG. 4 shows the influence of the electromagnetic field on the orientation of the reinforcement elements.

An electromagnetic coil 12 surrounding the reaction chamber 11 applies an electromagnetic field 19 to the suspension within the reaction chamber as it is heated. The interaction of the electromagnetic field with the electromagnetic moment of the reinforcement elements causes the reinforcement elements to become aligned with the electromagnetic field before they migrate into the powder, as shown in FIGS. 3 and 4.

The electromagnetic field may be constant, or may alternate at a frequency which will depend on the natural frequencies of the reinforcement elements in the suspension, but is typically between $10^{-3}$ Hz and $10^5$ Hz.

Optionally the coil 12 may be used as the heating element for heating the suspension within the reaction chamber, rather than a separate heating element.

Figure 6:
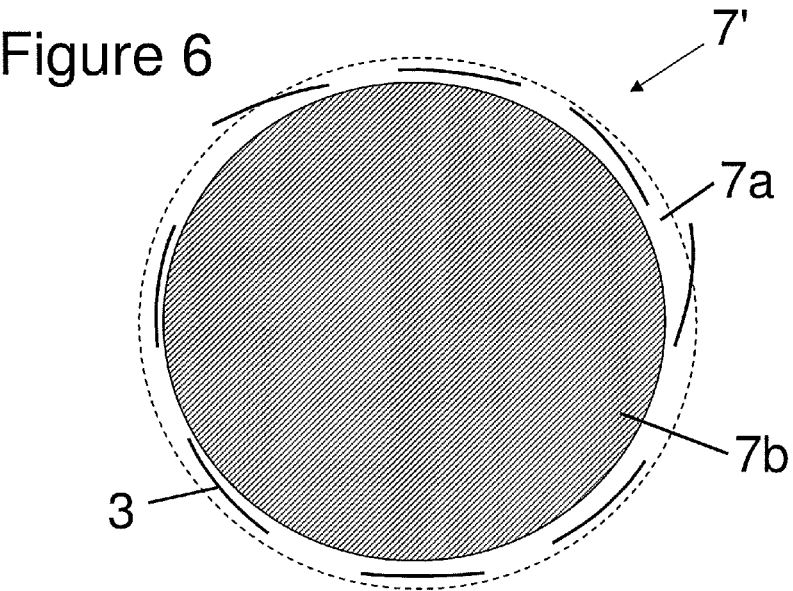
FIG. 6 is a sectional view of a modified powder particle.

FIG. 5 is a schematic diagram of a single particle 7' of modified polymer powder and FIG. 6 is a cross-sectional view of such a particle. The reinforcement elements 3 adhere to the surface of the polymer particle so that the modified particle has a surface or interphase region 7a loaded with reinforcement elements 3 and a core 7b where the concentration of the reinforcement elements is lower than in the surface region 7a, and is preferably substantially free of said reinforcement elements. Note that some of the elements 3 are embedded entirely within the surface region 7a, whereas others are partially embedded and partially protrude outside. Preferably the elements 3 are embedded entirely with the surface region. As shown in FIG. 5 the reinforcement elements within the particle are at least partially aligned with each other so that they impart to the particle an overall magnetic moment M. Neither of these Figures is drawn to scale.

The core 7b of each particle which is substantially free of reinforcement elements 3 occupies more than 1% of the volume of that particle, preferably more than 5% of the volume of that particle, and more preferably more than 20% of the volume of that particle.

FIG. 5 shows a fairly high degree of alignment, with the reinforcement elements being aligned with opposed poles 18 of the particle in a similar manner to lines of longitude on a globe. The degree of alignment may be less than shown in FIG. 5 and will depend to a certain extent on the strength of the electromagnetic field, the electromagnetic moment of the reinforcement elements, and the size of the particles. Although the particles will be rotating with respect to the electromagnetic field as the reinforcement elements migrate into the surface region 7a, it is postulated that the electromagnetic moment of the reinforcement elements will cause them to exert a force on the particle due to their interaction with the electromagnetic field which gradually reduces this rotation, so that over time the degree of alignment of successive reinforcement elements migrating into the surface region 7a will increase as the rotation decreases.

Returning to FIG. 1: under pressure the liquid containing the modified powder is ejected via a pressure reducing valve (not shown) through the exhaust pipe 13 as a flow or spray of material 14 into a collecting vessel 15. The material in the collecting vessel 15 can then be dried to leave a dried powder shown in FIG. 7.

Any suitable liquid 2,6 may be used. A suitable liquid should not react adversely with or cause any significant degradation of the polymer or of the reinforcement elements in the conditions of the process, and must remain liquid at a temperature and pressure suitable for softening the polymer. The liquid should not act as a good solvent for the polymer. The liquid is preferably easily removed from the mixture containing the particulate polymer. The liquid may be an organic liquid, and may be polar or non-polar. Suitable organic liquids include, but are not limited to, toluene, N,N-dimethylformamide, and chloroform. Alternatively water may be used as the liquid.

The method is a continuous process in which material is simultaneously fed into the reaction chamber 11 via its inlet and out of the reaction chamber 11 via its outlet as the suspension is heated and irradiated. Such continuous processing enables the volume of the reaction chamber 11 to be relatively small and hence enables a relatively strong field to be applied by the coil 12 during processing. The field has a strength, induced by alternating or direct current, which is greater than 10 kV/m and preferably greater than 16 kV/m but less than 65 kV/m and preferably less than 44 kV/m.

The dried modified powder from the collecting vessel 15 can then be used as feedstock for an additive powder bed manufacturing process as described in WO2009/022167. In such a process a recoater picks up powder feedstock from one of a pair of feed containers and recoats a continuous bed of powder over a build platform. The recoater imparts a degree of packing between adjacent polymer powder particles. Incorporated into the additive layer manufacturing system is a source of a strong electromagnetic field and a source of ultrasonic agitation, such as an ultrasonic horn.

Under ultrasonic agitation the particles are free to rotate relative to each other, which once the electromagnetic field is applied causes the particles to rotate and line up with each other in the direction of the field. Preferably with the field remaining on, a heat source is then turned on to melt the polymer matrix material and form a consolidated layer, whilst maintaining the global orientation of the CNTs. Alternatively the heat source could be operated independently of the field remaining on. The heat source may for instance be a laser which scans a laser beam across the build platform and directs energy to selected parts of the bed. The heat melts and consolidates the selected parts of the bed, and any un-melted powder can be removed after the process is complete.

The process then repeats to form a component with a series of layers. The laser beam is scanned and modulated under control of a computer model to form each individual layer with a desired net-shape with the reinforcement elements in each layer being aligned before the next layer is formed on top of it. The properties of the component may be controlled by applying different electromagnetic fields to the feedstock in at least two of the layers.

Unlike the powder feedstock particles described in WO2009/022167, the powder particles 7,7' can be made with a relatively high sphericity (in other words they can be substantially spherical). More specifically, the cylindrical powder particles in WO2009/022167 have a sphericity which can be no higher than about 0.874 (in the case where the height of the cylinder is exactly equal to its diameter) and in practice will be much lower on average. The average sphericity of the powder particles 7,7' on the other hand can be higher—for instance over 0.85, over 0.9 or over 0.95. The enhanced sphericity of the particles enables the powder particles to flow and pack more easily as they are applied to the build platform than the cylindrical particles described in WO2009/022167.

Figure 7:
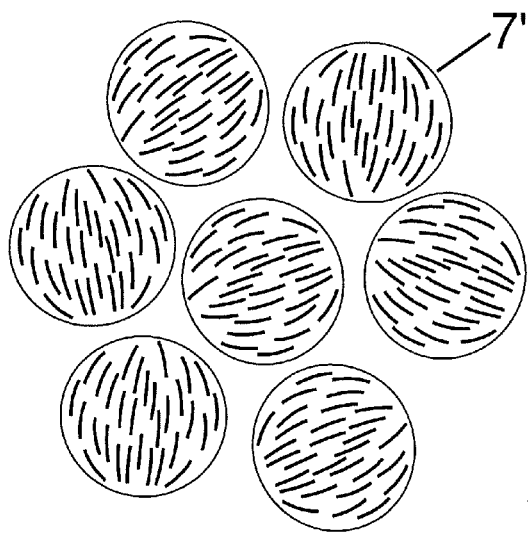
FIG. 7 shows a collection of unaligned powder particles.
Figure 8:
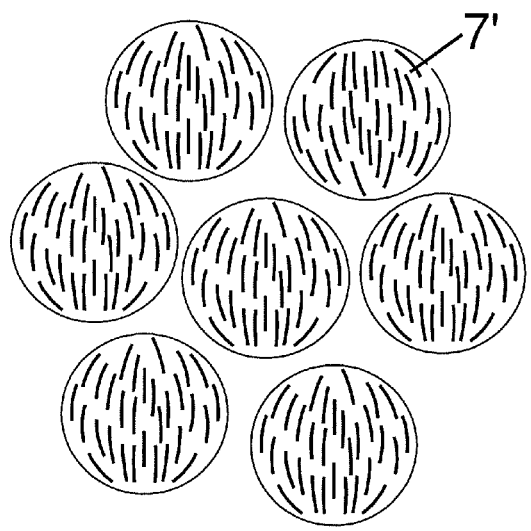
FIG. 8 shows the particles of FIG. 7 after they have become aligned.

FIG. 7 shows a collection of randomly aligned powder particles 7' produced by the apparatus of FIG. 1. Application of an electromagnetic field during the additive manufacturing process described above causes the particles to rotate so that their poles become aligned with the field as shown in FIG. 8. The enhanced sphericity enables the particles to rotate into alignment more easily as they are agitated on the build platform in the electromagnetic field than the cylindrical particles described in WO2009/022167.

Although the invention has been described above with reference to one or more preferred embodiments, it will be appreciated that various changes or modifications may be made without departing from the scope of the invention as defined in the appended claims.

The invention claimed is:

1. A method for producing modified thermoplastic polymer powder particles comprising aligned reinforcement elements, the method comprising:
    feeding a liquid suspension comprising reinforcement elements and thermoplastic polymer powder into a reaction chamber, the reinforcement elements having an electromagnetic moment;
    heating the suspension within the reaction chamber so as to soften the thermoplastic polymer powder and cause the reinforcement elements to migrate into the softened powder, thereby forming modified thermoplastic polymer powder;
    irradiating an electromagnetic field to the suspension within the reaction chamber during said heating, an interaction of the electromagnetic field with the electromagnetic moment of the reinforcement elements causing the reinforcement elements to align with the electromagnetic field before said migrating into the softened powder; and
    separating the modified powder from the liquid,
    wherein the reaction chamber has an inlet and an outlet, the method operating continuously by simultaneously feeding the liquid suspension into the reaction chamber via the inlet and discharging a liquid suspension of the modified powder from the reaction chamber via the outlet during said heating and irradiating.

2. The method of claim 1, wherein the thermoplastic polymer powder is mixed with the reinforcement elements in a mixing chamber before said feeding into the reaction chamber.

3. The method of claim 2 further comprising agitating the thermoplastic polymer powder and the reinforcement elements in the mixing chamber.

4. The method of claim 3, wherein said agitating is conducted via ultrasound.

5. The method of claim 1, wherein said irradiating is by a coil surrounding the reaction chamber.

6. The method of claim 5, wherein the coil also provides said heating.

7. The method of claim 1, wherein the field has a strength greater than 10 kV/m.

8. The method of claim 1, wherein said separating occurs after said discharging.

9. The method of claim 1, wherein the field has a strength greater than 16 kV/m.

10. The method of claim 1, wherein the field has a frequency between $10^{-3}$ Hz and $10^5$ Hz.

11. The method of claim 1, wherein the modified particles have an interphase region loaded with the reinforcement elements and a core substantially free of the reinforcement elements.

12. The method of claim 1, wherein the modified particles comprise the reinforcement elements embedded entirely within a surface region thereof.

13. The method of claim 1, wherein the modified particles comprise some of the reinforcement elements embedded entirely within a surface region thereof and some of the reinforcement elements embedded partially within the surface region.

14. The method of claim 1, wherein a temperature and pressure of the reaction chamber are chosen so that the boiling point of the liquid is slightly above the melting point of the thermoplastic polymer powder.

15. The method of claim 1, wherein the liquid suspension is fed into the reaction chamber as a homogenized suspension.

* * * * *